US012775872B1

(12) United States Patent
Bangani et al.

(10) Patent No.: US 12,775,872 B1
(45) Date of Patent: Oct. 27, 2026

(54) AUTOMATED MACHINE LEARNING

(71) Applicant: Amazon Technologies, Inc., Seattle, WA (US)

(72) Inventors: Jitendra Bangani Bangani, Bothell, WA (US); Narayan Agrawal, Redmond, WA (US); Namita Das, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1093 days.

(21) Appl. No.: 17/486,749

(22) Filed: Sep. 27, 2021

(51) Int. Cl.
*G06N 20/00* (2019.01)
*G06F 18/20* (2023.01)

(52) U.S. Cl.
CPC .......... *G06N 20/00* (2019.01); *G06F 18/285* (2023.01)

(58) Field of Classification Search
CPC .......... G06N 20/00; G06N 20/20; G06N 5/02; G06N 20/10; G06F 18/285; G06F 16/58; H04L 51/212; G01N 21/3577; A63F 13/90
See application file for complete search history.

(56) References Cited

U.S. PATENT DOCUMENTS

| | | | | |
|---|---|---|---|---|
| 8,364,613 | B1 * | 1/2013 | Lin | G06N 7/01 700/65 |
| 11,399,035 | B1 * | 7/2022 | Batchu | G06N 5/02 |
| 11,443,237 | B1 * | 9/2022 | Song | G06F 16/338 |
| 11,620,481 | B2 * | 4/2023 | Givental | G06F 18/214 706/22 |
| 11,640,563 | B2 * | 5/2023 | Higgins | G06N 20/00 706/12 |
| 12,050,625 | B2 * | 7/2024 | Schmidt | G06F 16/285 |
| 12,450,525 | B2 * | 10/2025 | Padmanabhan | G06N 20/20 |
| 2015/0170048 | A1 * | 6/2015 | Lin | H04L 51/212 706/12 |
| 2017/0286839 | A1 * | 10/2017 | Parker | G06N 20/20 |
| 2019/0138946 | A1 * | 5/2019 | Asher | G06N 5/04 |
| 2021/0021631 | A1 * | 1/2021 | Okutan | H04L 63/164 |
| 2022/0036246 | A1 * | 2/2022 | Chen | G06N 5/022 |
| 2022/0122000 | A1 * | 4/2022 | Li | G06F 18/2113 |
| 2022/0147865 | A1 * | 5/2022 | Naidoo | G06F 16/58 |
| 2022/0292308 | A1 * | 9/2022 | Schwiep | G06F 18/2163 |

FOREIGN PATENT DOCUMENTS

| | | | | |
|---|---|---|---|---|
| CA | 3164852 | A1 * | 7/2021 | G01N 21/3577 |
| WO | WO-2021046519 | A1 * | 3/2021 | A63F 13/90 |

OTHER PUBLICATIONS

Dietterich, Thomas G. "Ensemble Learning", Sep. 4, 2002, Oregon State University, Department of Computer Science (Year: 2002).*

Ma, Zhixing, Srinivas Chakravarthi Thandu, Rohit Menon, Vivek Ramamoorthy, and Bernie Wang, "Automating your Amazon Forecast workflow with Lambda, Step Functions, and CloudWatch Events rule", Feb. 19, 2020, AWS Machine Learning Blog (Year: 2020).*

* cited by examiner

*Primary Examiner* — Steven P Sax
(74) *Attorney, Agent, or Firm* — Davis Wright Tremaine LLP

(57) ABSTRACT

A system provides an application programming interface to initiate a request to provide predictions based on a dataset. In response to the request, the system analyzes the dataset and selects, based on the analysis, one or more types of predictive models to use to make predictions. The system trains the predictive models using the dataset, and uses the predictive models to make predictions. In response to an additional dataset, the system replaces one or more of the predictive models using different model types, based on analysis of the additional dataset.

20 Claims, 9 Drawing Sheets

AUTOMATED MACHINE LEARNING

BACKGROUND

Machine learning is an evolving field that is increasingly used in a wide variety of applications. New machine learning techniques continue to be developed. Although these techniques have improved capabilities for making accurate and useful predictions, they remain difficult to use, in part because they tend to require extensive knowledge and experience.

BRIEF DESCRIPTION OF THE DRAWINGS

Various techniques will be described with reference to the drawings, in which.

DETAILED DESCRIPTION

In an example, a system provides automated predictive services based on a request from a client to provide the predictive services. The request contains data which is limited primarily to an example of the data to be analyzed. The request may also contain data indicating preferences for the predictions, such as an indication regarding how often predictions should be provided. However, the request does not contain information specifying the types of machine learning models to be used, or any parameters related to a machine learning model. Instead, the system automatically determines the types and parameters by analyzing the provided dataset, trains and validates one or more machine learning models according to the automatically determined types and parameters, and uses the machine learning model (s) to provide predictions to the client.

In the example system, one or more advantages are conveyed by excluding type and parameter information from the request. These advantages can include that the client is insulated from dependencies on the types of machine learning models used, how those models are trained, and whether or not a model remains a useful predictive tool. For example, a particular type of machine learning model might be best suited for making predictions on data that follows seasonal variations, while some other type of machine learning model might be better for data that contains primarily random variations. Moreover, the patterns exhibited in the data may vary over time, so that a model well suited for making predictions on certain types of patterns may become less well suited as the data patterns evolve. By insulating the client from the types and parameters of the machine learning models, the system is able to adapt to new or changing patterns without requiring the client to be reprogrammed. Similar benefits are obtained as machine learning techniques evolve, since better machine learning models may be introduced and used to obtain predictions without client burden.

Figure 1:
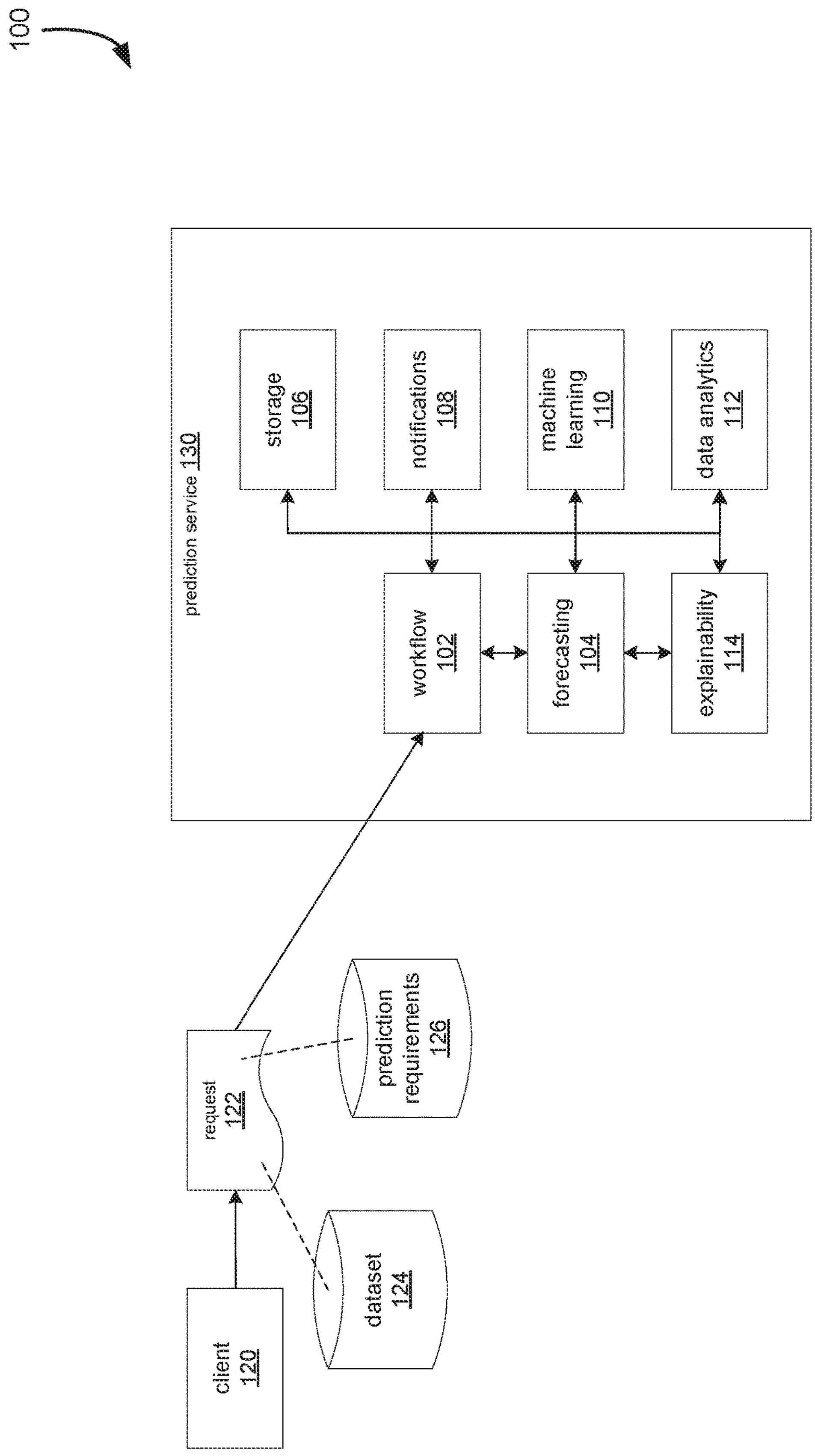
FIG. 1 illustrates a system to perform automated machine learning, in accordance with at least one embodiment.

The example system may be further understood in view of FIG. 1, which illustrates a system to perform automated machine learning, in accordance with at least one embodiment. In the example 100, a client 120 sends a request 122 to prediction service 130. The request 122 is made to ask the prediction service 130 to provide predictions, without specifying how those predictions are to be made. The client 120 makes the request by invoking an application programming interface, and the request 122 comprises data that is associated with this invocation. An application programming interface can include any means for interfacing or communicating between computing systems. Examples may include, but are not necessarily limited to, APIs based on representational state transfer ("REST"), simple object access protocol ("SOAP"), JavaScript object notation ("JSON"), yet another markup language ("YAML"), and extensible markup language ("XML").

In the example 100, the request 122 comprises a dataset 124 and prediction requirements 126. The dataset 124 comprise data on which predictions may be made, or on which subsequent predictions may be made using similar data. Here, similarity refers to the data having the same meaning, for example referring to the same measure or quantity. In at least one embodiment, the dataset comprises time series data that is to be analyzed, where a time series refers to data points or measurements obtained over time. These data points may occur at regular or irregular intervals. The dataset 124 may further comprise related data. The related data can include data that, while not part of a time series, is related in some way, for example by providing contextual information, metadata, related time series, and so forth. To illustrate, if the dataset 124 were to comprise a time series of units of product "A" sold per day, the related data might include a set of values indicating dates that the price of "A" was discounted. It will be appreciated that this example is intended to be illustrative rather than limiting, and should not be construed in a manner which would limit the scope of potential embodiments to only those that incorporate the specific example provided.

The request 122, in at least one embodiment, may include prediction requirements 126. This may include information describing the client's 120 requirements for predictions generated by the prediction services. These may include aspects such as how often a prediction should be made, how much computing capacity should be expended in making a prediction, or indications of the nature of predictions that are desired. However, the prediction requirements 126, and more generally the request 122, do not include explicit or implicit indications of the types of machine learning models that might be used, or any parameters or hyperparameters that might be associated with a machine learning model. The machine learning models to be used are instead determined by the prediction service 130 based on analysis of the dataset 124.

The type of a machine learning model refers to one or more algorithm or technique on which the model is based, the architecture of a neural network, a method of training, a method of validation, and so forth. The parameters or hyperparameters of a machine learning model refers to one or more of weights or activation thresholds, learning rates, number of epochs, and so forth.

The prediction service 130 comprises components that collectively implement one or more embodiments of the techniques described herein. Examples of such components may include, but are not limited to, the components 102-114 depicted in FIG. 1. In at least one embodiment, a component comprises one or more computing devices that perform one or more of aspects of embodiments of a prediction service implemented as a distributed computing system, and which communicate with other components in the distributed computing system.

In at least one embodiment, the prediction service 130 comprises a workflow component 102 which responds to the request 122 by orchestrating the various operations that may be needed to provide the client 120 with predictions. The workflow component 102 may therefore interact with other components 104-112 to initiate operations to obtain predictions, and provide any resulting predictions to the client 120.

In at least one embodiment, the prediction service 130 includes a forecasting component 104, which analyzes the dataset 124, selects appropriate machine learning models, uses the machine learning component 110 and/or data analytics component 112 to obtain the selected machine learning models, and uses the obtained machine learning models to obtain predictions based on the dataset 124 or a subsequently provided dataset of corresponding meaning.

The machine learning component 110, in at least one embodiment, provides services related to the generation, training, deployment, and/or execution of a machine learning model. For example, the machine learning component 110 may provide facilities to implement machine learning algorithms such as supervised learning, unsupervised learning, textual analysis, regression, time series forecasting, clustering, grouping, anomaly detection, text summarization, machine translation, and so on. It will be appreciated that this example is intended to be illustrative rather than limiting, and should not be construed in a manner which would limit the scope of potential embodiments to only those that incorporate the specific example provided. As used herein, machine learning, which may also be referred to as artificial intelligence, encompasses these and other techniques for obtaining predictions. Similarly, a prediction encompasses a wide range of potential inferences, classifications, conclusions, or observations that may be drawn from a dataset using a machine learning model.

The data analytics component 112 may perform functions such as data mining, knowledge discovery, and so forth. It will be appreciated that these examples are intended to be illustrative rather than limiting, and should not be construed in a manner which would limit the scope of potential embodiments to only those that incorporate the specific examples provided.

As used herein, a predictive model generally refers to any of a wide variety of algorithms, models, or techniques for obtaining insights from data, including but not necessarily limited to those based on artificial intelligence, deep learning, expert systems, or data mining.

In at least one embodiment, the prediction service 130 includes additional components, such as a storage component 106 and notifications component 108, to perform additional operations associated with the provision of predictive services. The storage component 106 may be used to provide storage for the data and machine learning models used to provide the predictive services. The notifications component 108 may be used to generate and send notifications, such as those related to predictions generated by one of the service's predictive models, to the client 120.

The prediction service 130 may further comprise an explainability component 114, which provides insights regarding the predictions provided by the service. The explainability component 114 may, for example, provide details regarding the confidence the prediction service 130 has in a prediction, the events believed to be relevant to the prediction, and so forth.

Figure 2:
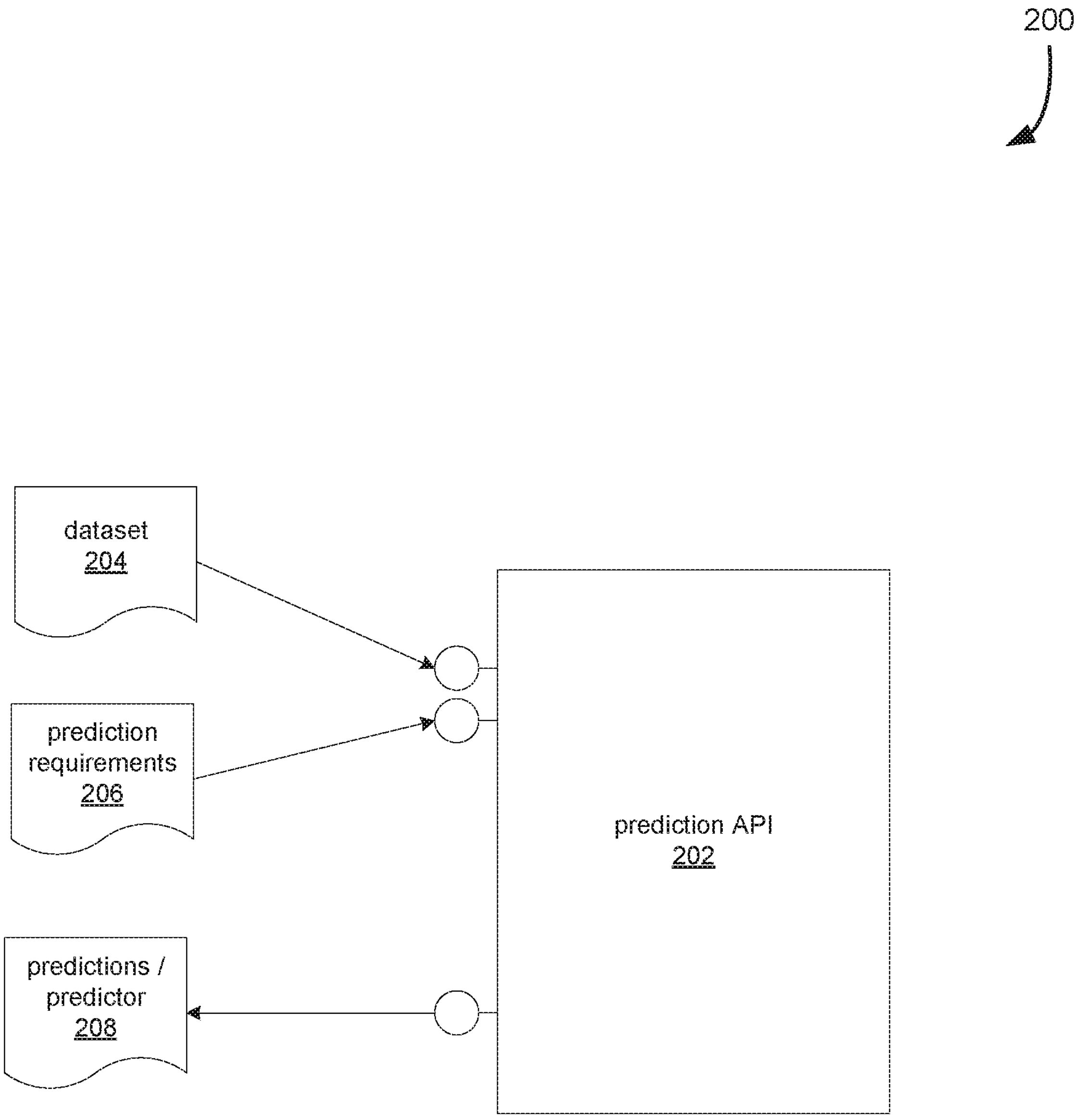
FIG. 2 illustrates an application programming interface to perform automated machine learning, in accordance with at least one embodiment.

The programming interface described in relation to FIG. 1 may be further understood in view of FIG. 2, which illustrates an application programming interface 200 to perform automated machine learning, in accordance with at least one embodiment.

In at least one embodiment, a system to provide prediction services, such as the prediction services 130 depicted in FIG. 1, comprises at least one processor and at least one memory that comprises computer-executable instructions. The instructions, in response to execution by the at least one processor, cause the system to receive, by an application programming interface, a request to obtain predictions. Here, receiving the request refers to the system obtaining data, such as data sent from client 120, that corresponds to a request for obtaining predictions. The request may implicitly indicate that the system should generate one or more predictive models to use to make the requested predictions, based at least in part on a dataset included in the request. However, the type and identity of the one or more predictive models are not specified by the request. As such, the request does not implicitly or explicitly include information indicating the type or identity of a machine learning model, technique, or algorithm, and likewise does not implicitly or explicitly include any parameters or hyperparameters that might be associated with a machine learning model, technique, or algorithm.

As depicted in FIG. 2, the request may comprise dataset 204 and prediction requirements 206, which are supplied as parameters to a prediction API 202. The dataset 204 and prediction requirements 206 may correspond to the dataset and prediction requirements described in relation to FIG. 1, and likewise do not contain explicit or implicit indications of what machine learning model(s) the predictive service should use to generate predictions.

In response to the request, the system analyzes the dataset and then determines, based on the analysis, the types of predictive models to use. In at least one embodiment, the system identifies portions or segments of the dataset that contain patterns, and selects the types of predictive models most appropriate for making predictions on those types of data.

Having selected the types of the predictive models, the processing of the prediction API 202 continues with training of the models. The system trains predictive models according to the determined one or more types. In at least one embodiment, the system trains a predictive model with a portion of data that exhibits a pattern on which the model's type was selected. A subset of this portion is used for training and an additional subset is used for validation. Both training and validation may be performed automatically, by the system.

Having trained the generated models, the system then generates a prediction using the trained predictive models. The predictions may be made based on the same dataset that was provided initially, or made based on a subsequently provided dataset. With reference to FIG. 2, the service may provide predictions/predictor 208 via a return value or callback mechanism of the prediction API 202. In at least one embodiment, a predictor object is returned which models one or more predictive models, but functions in a manner which isolates the client of the API 202 from dependencies on the underlying machine learning techniques or algorithms used. Alternatively, in some embodiments the API 202 returns predictions to the client of the API 202 directly.

In some cases, a subsequently provided dataset may exhibit patterns that is not present in the original dataset, or may include data that could be used to improve the training of existing models. In at least one embodiment, the service responds to the provision of an additional dataset by analyzing patterns in the additional dataset, determining to replace a predictive model with a predictive model of a different type, training the new model, and generating a prediction using the new model. Similarly, the system may analyze patterns in the database and determine to perform further training of an existing model.

Figure 3:
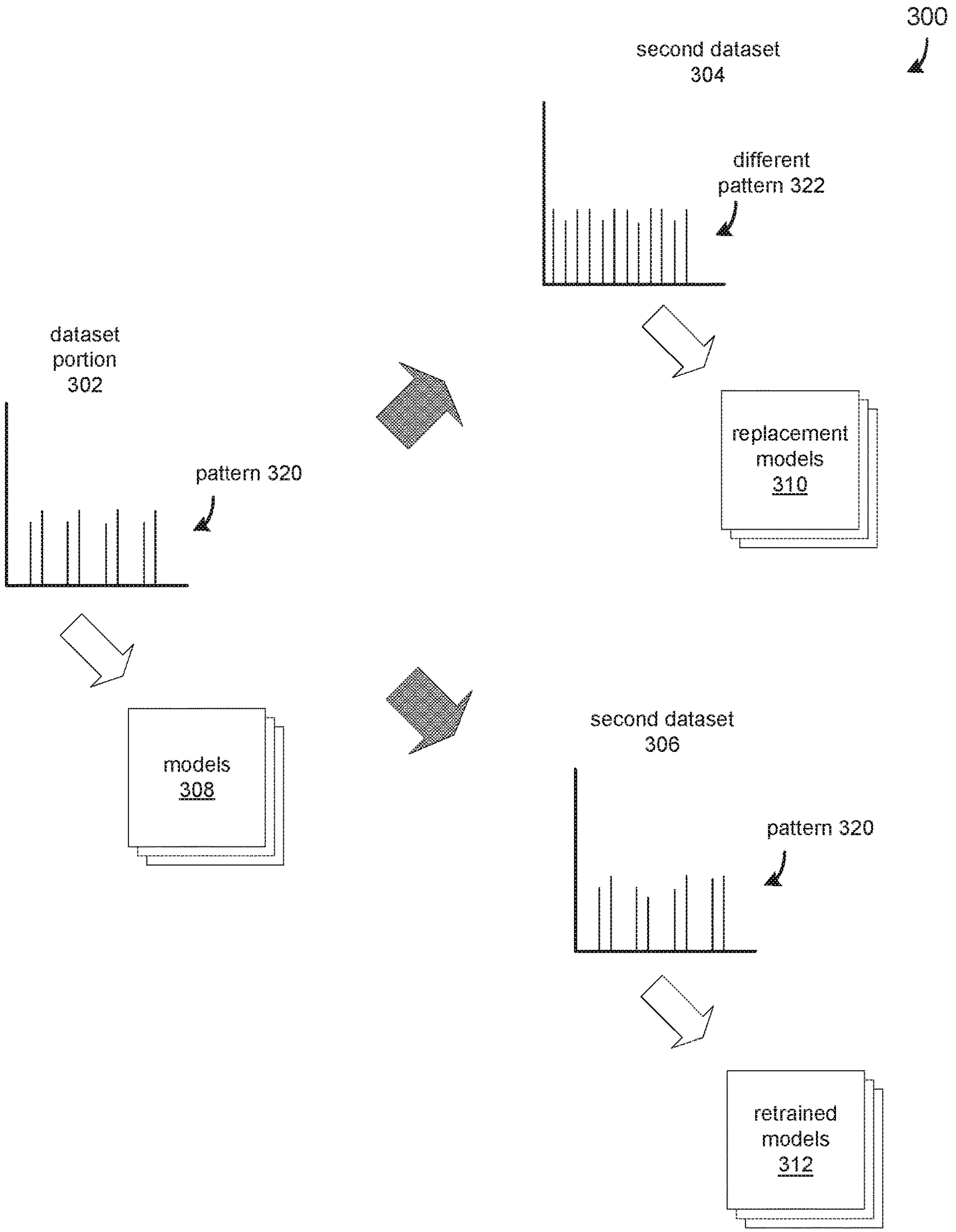
FIG. 3 illustrates automatic replacement and retraining for automated machine learning, in accordance with at least one embodiment.

FIG. 3 illustrates automatic replacement and retraining for automated machine learning, in accordance with at least one embodiment. In at least one embodiment, a system to provide prediction services, such as the prediction services 130 depicted in FIG. 1, comprises instructions that, in response to execution by at least one processor of the system, cause the system to determine that a portion of a dataset exhibits a pattern and that another portion of the dataset exhibits a different pattern. Based on these patterns, the system determines a type of a first predictive model to use to make predictions about data that exhibits the first pattern, and a type of predictive model to use to make predictions about data that conforms to the second pattern. These predictive models can then be used to provide a client with predictions. The client may subsequently provide additional data, and this data can be used to provide more up-to-date predictions by replacing existing models with models of a different type or retraining existing models. In the example 300, it is assumed for illustrative purposes that a dataset portion 302 corresponds to a portion of a time series in a dataset provided to a prediction service, and that the dataset portion 302 exhibits the illustrated pattern 320. The prediction service may then generate and train one or models 308, using model types selected based on their suitability for the pattern 320. These models 308 may then be used by the service to make predictions and provide the predictions to a client.

In one case of the example 300, a second dataset 304 is provided to the prediction service, and the time series previously exhibiting pattern 320 instead exhibits a different pattern 322. Because the existing models 308 may not be well suited for this new pattern 322, the prediction services generate one or more replacement models 310, using a type of model deemed suitable for the new pattern 322. Note that in some cases, the time series in the second dataset 304 may exhibit the new pattern 322 in addition to exhibiting the original pattern 320. In such cases, the system may generate one or more new models suitable for use with data having the new pattern and use the new models in addition to the original models 308.

In another case of the example 300, the second dataset 306 may exhibit the same pattern 320. In such cases, the prediction service may retrain the original models 308 to generate one or more retrained models 312. Note that retraining may include training a model from scratch, for example by reinitializing a model's parameters, or refining the training of an existing model.

Figure 4:
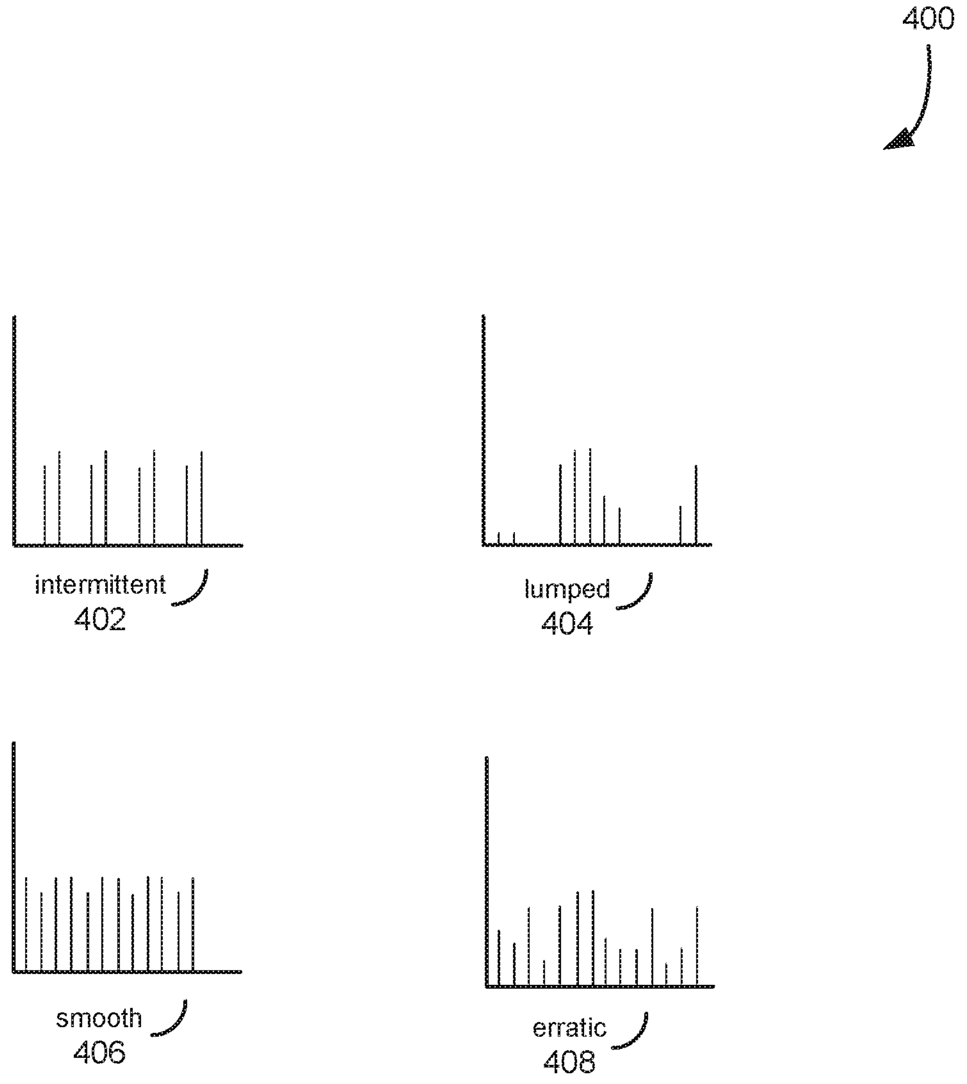
FIG. 4 illustrates an example of pattern analysis of a dataset, in accordance with at least one embodiment.

FIG. 4 illustrates an example of pattern analysis of a dataset, in accordance with at least one embodiment. The example 400 illustrates various patterns that might be observed in a time series or other data in a dataset. The patterns can include intermittent 402, lumped 404, smooth 406, and erratic 408. It will be appreciated that these examples are intended to be illustrative rather than limiting, and should not be construed in a manner which would limit the scope of potential embodiments to only those that incorporate the specific examples provided.

In the example 400, the various patterns 402-408 are examples of patterns that might be detected in a time series, or other data, that has been provided to a prediction service by a client. Analysis of a time series can indicate boundaries of one or more patterns, including but not necessarily limited to the example patterns 402-408. The prediction service may then select appropriate model types based on the identified patterns, and proceed to generate and train predictive models of the selected types.

Figure 5:
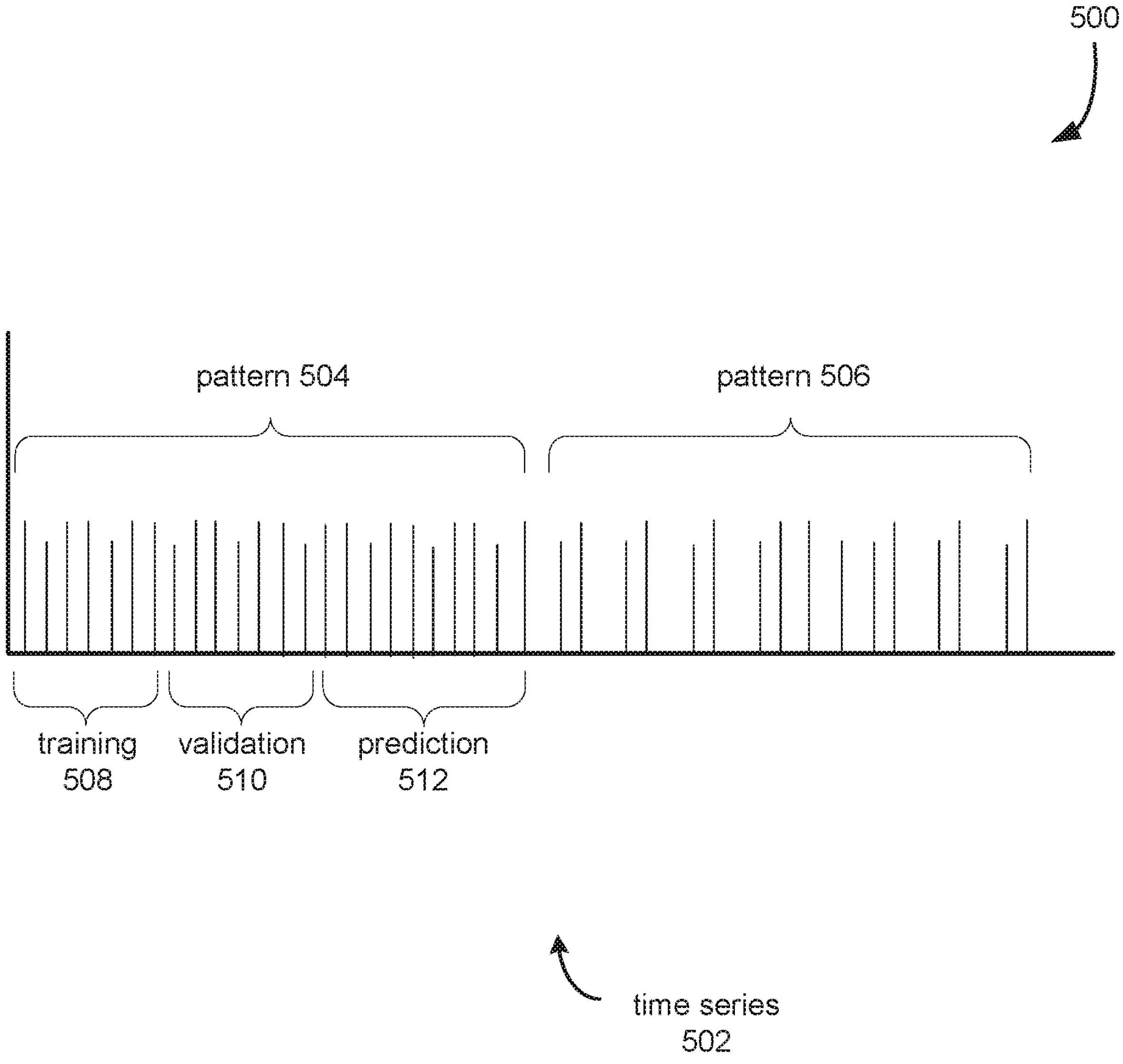
FIG. 5 illustrates an example of training a predictive model based on patterns detected in a dataset, in accordance with at least one embodiment.

FIG. 5 illustrates an example of training a predictive model based on patterns detected in a dataset, in accordance with at least one embodiment. In the example 500, a time series 502 is analyzed by a prediction service, such as the prediction service depicted in FIG. 1, to identify portions exhibiting certain patterns 504, 506. In the example 500, two patterns are observed, although in various cases and embodiments there could be more or fewer patterns identified.

A given portion of the time series 502, such as the portion corresponding to pattern 504, may be further subdivided into a training portion 508, validation portion 510, and prediction portion 512. In at least one embodiment, the prediction service uses the training portion 508 to train a model selected for use with data exhibiting pattern 504, and uses the validation portion 510 to validate the trained model. The prediction service can then use the remaining prediction portion 512 to make predictions about the data.

In at least one embodiment, this process is repeated for other portions of the time series 502. For example, the portion of the time series 502 that comprises another pattern 506 may be segmented into training, validation, and prediction sub-portions. The training and validation portions may then be used to train and validate a model suitable for data exhibiting pattern 506, and the prediction sub-portion then used to make predictions using the resulting model.

Note that although FIG. 5 depicts an example of a single time series with multiple patterns, a dataset might contain multiple time series. Each of the time series might then exhibit one or more patterns. The prediction service may analyze these patterns as just described, and use data exhibiting the identified patterns to select and train a predictive model.

Figure 6:
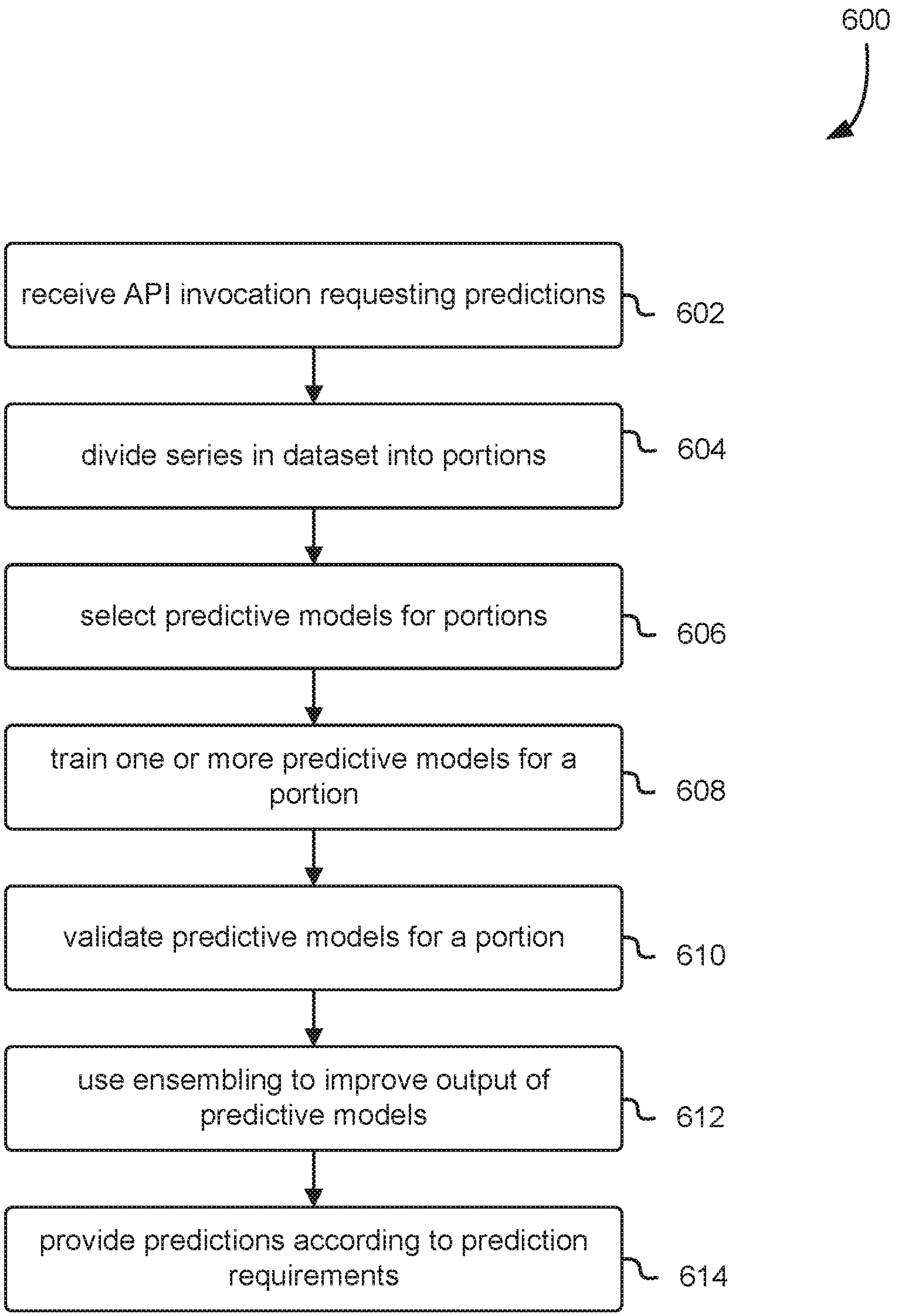
FIG. 6 illustrates a process for performing automated machine learning in response to a request to obtain predictions, in accordance with at least one embodiment.

FIG. 6 illustrates a process for performing automated machine learning in response to a request to obtain predictions, in accordance with at least one embodiment. Although the example procedure 600 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

Figure 9:
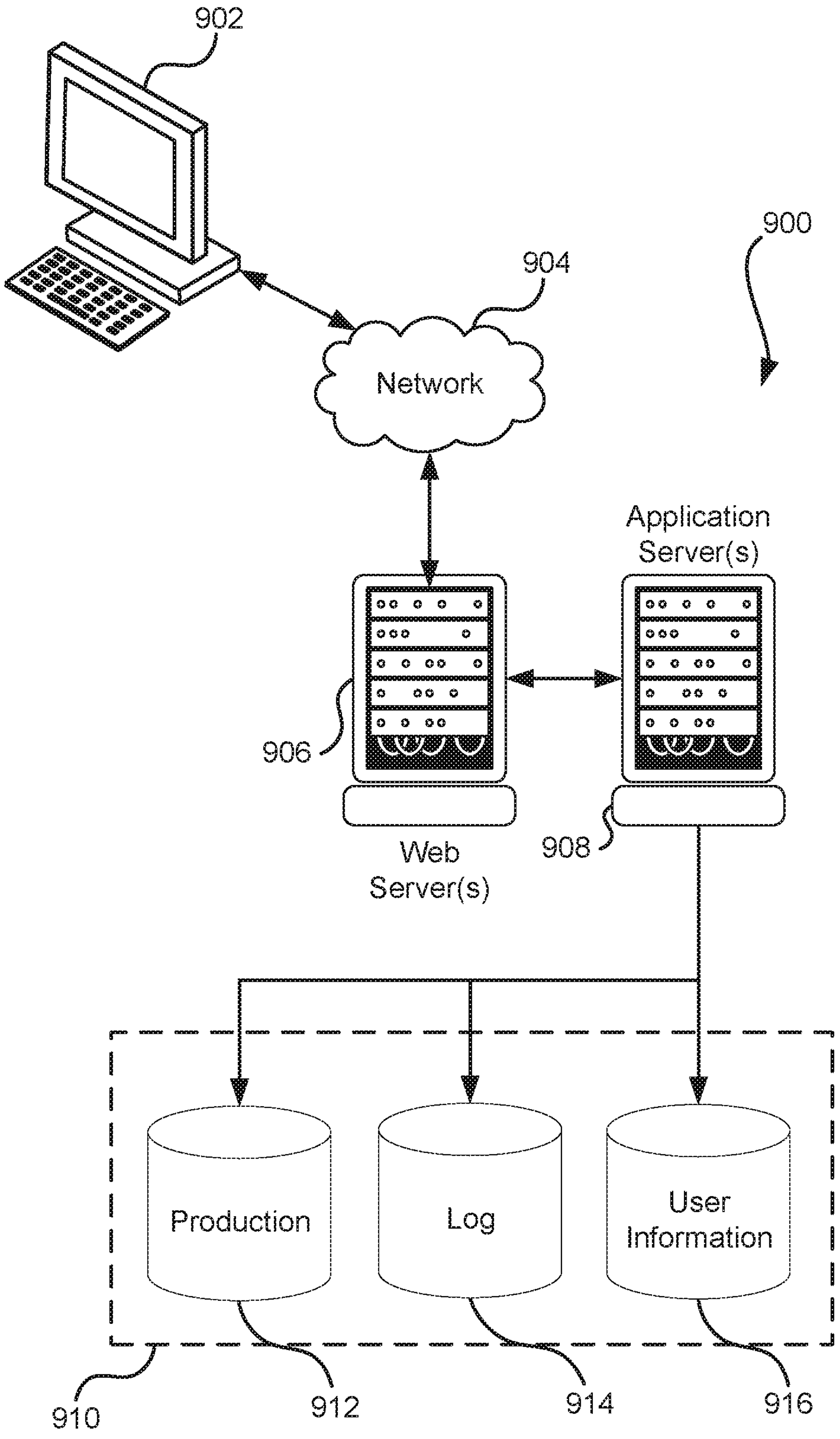
FIG. 9 illustrates a system in which various embodiments can be implemented.

In at least one embodiment, the steps or operations of FIG. 6 are implemented by a prediction service, such as the prediction service depicted in FIG. 1. This prediction service may be implemented by any suitable hardware or combination of hardware. In at least one embodiment, a distributed system such as the one depicted in FIG. 9 is used.

At 602, the prediction services receive an API invocation that requests predictions. For example, a client may invoke an API, similar to the one depicted in FIG. 2, that provides a dataset and one or more requirements, such as frequency, for making predictions. As with the API described in relation to FIG. 2, the request for predictions does not include any explicit or implicit indications of the types of predictive models to be used, or any parameters or hyperparameters related to a predictive model. This allows the client issuing the request to be isolated from changes to the models used to make predictions, and allows the client to obtain predictions the client's developer needing to have knowledge of machine learning. As used herein, frequency refers to a time period, or other span of data, over which predictions should be generated. For example, for a time series the application programming interface might be used to specify predictions frequencies of daily and weekly, indicating that the predictions generated by the system should pertain to each day and to each week.

At 604, the prediction service divides series in the dataset into portions, based on patterns exhibited by the series. Dividing a series may include identifying boundaries between different patterns in a series, or to identifying other divisions or segments in a series. This process may also be referred to as segmenting a series.

At 606, the prediction service selects predictive models to use for the identified portions. In at least one embodiment, the prediction service selects one or more predictive models for each portion, based on the type of pattern identified in the corresponding portion. The service may also determine parameters, including hyperparameters, for the predictive models. These are not specified via the programming interface, but rather determined by the system based on factors that may include, but are not necessarily limited to, the type of predictive model chosen, the amount of data available for training, validation, and prediction, and so forth.

At 608, the prediction service trains one or more predictive models for a portion of the data. For example, the prediction service may divide a portion into training, validation, and prediction sub-portions as described in relation to FIG. 5, and use the training sub-portion to train one or more predictive models.

At 610, the prediction service validates predictive models for a portion, using a sub-portion reserved for validation. For example, in at least one embodiment, a predictive model is trained using a first portion of the dataset determined to comprise a pattern, and validated using a second portion of the dataset determined to comprise the same pattern.

At 612, the prediction service may use ensembling techniques to improve prediction results. This may comprise using multiple models trained and validated in the earlier steps to obtain predictions, and selecting the best predictions from among those generated by these models.

A 614, the prediction service provides predictions to the client, in accordance with the prediction requirements supplied with the initial request. The requirements, as explained herein, may pertain to factors such as how often predictions should be provided, how granular the predictions should be, how much computational capacity should be used to make the predictions, and so forth.

Figure 7:
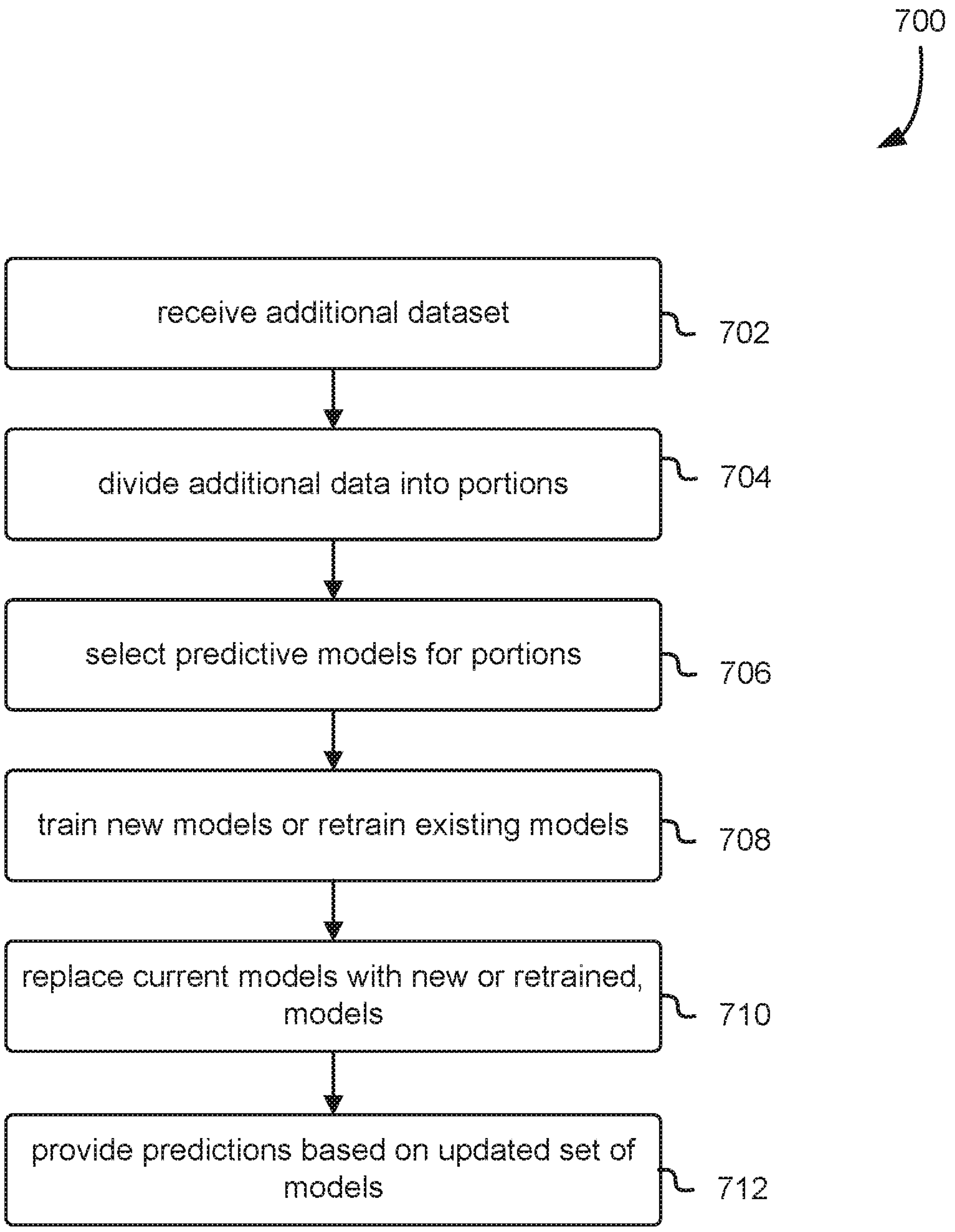
FIG. 7 illustrates a process for replacement and retraining in response to additional data, in accordance with at least one embodiment.

FIG. 7 illustrates a process for replacement and retraining in response to additional data, in accordance with at least one embodiment. Although the example procedure 700 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

In at least one embodiment, the steps or operations of FIG. 7 are implemented by a prediction service, such as the prediction service depicted in FIG. 1. This prediction service may be implemented by any suitable hardware or combination of hardware. In at least one embodiment, a distributed system such as the one depicted in FIG. 9 is used.

At 702, the prediction service receives an additional dataset. This may be done at the initiation of the client, by invoking an application programming interface. The service may then process the invocation by analyzing the new dataset.

At 704, the prediction service divides the additional dataset into portions. This component of the analysis may comprise identifying time series portions that exhibit distinct patterns, as described in relation to FIGS. 3-5.

At 706, the prediction service selects predictive models to use in relation to each portion. In at least one embodiment, this comprises determining that a pre-existing model remains suitable, determining that a pre-existing model remains suitable but should be retrained, determining that a pre-existing model should be replaced with a new model of a new type, or determining that a pre-existing model should be supplemented by an additional model of a new type.

At 708, the prediction service trains new models, or retrains existing models, as appropriate to the predictive models selected as described in relation to element 706. This may be done using a process similar to the examples described in relation to the preceding figures, relaying on data provided in the new dataset in addition to or instead of the data provided in the original, or prior, datasets.

At 710, the prediction service replaces existing models with new or retrained versions of the models obtained as described in relation to element 708. The service therefore obtains a new version of the predictive models, and can use this new version of the set of predictive models to make predictions.

At 712, the prediction service provides predictions based on the updated set of models.

Figure 8:
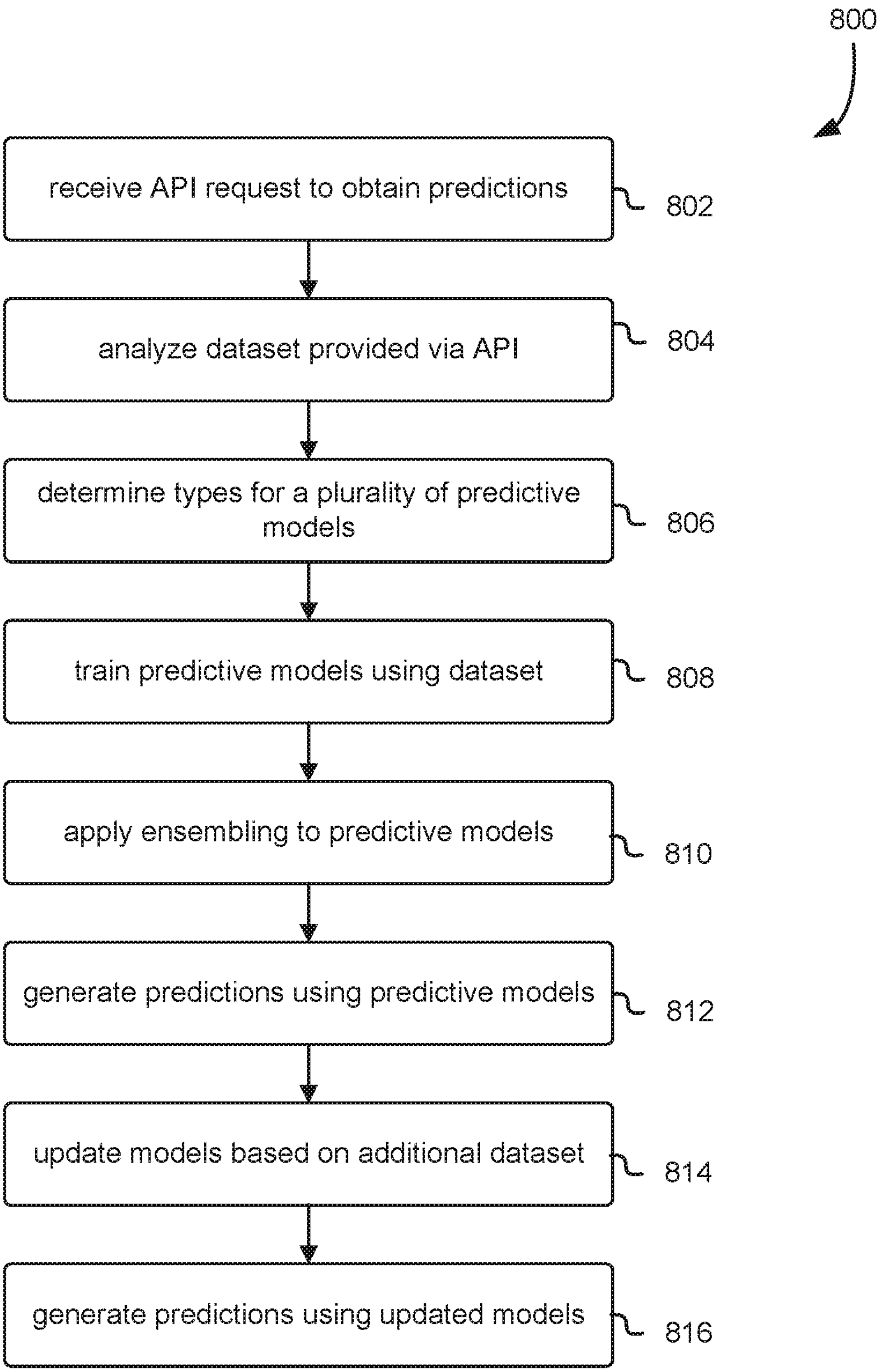
FIG. 8 illustrates a process for providing predictions, in accordance with at least one embodiment.

FIG. 8 illustrates a process for providing predictions, in accordance with at least one embodiment. Although the example procedure 800 is depicted as a series of steps or operations, it will be appreciated that embodiments of the depicted procedure may include altered or reordered steps or operations, or may omit certain steps or operations, except where explicitly noted or logically required, such as when the output of one step or operation is used as input for another.

In at least one embodiment, the steps or operations of FIG. 8 are implemented by a prediction service, such as the prediction service depicted in FIG. 1. This prediction service may be implemented by any suitable hardware or combination of hardware. In at least one embodiment, a distributed system such as the one depicted in FIG. 9 is used.

At 802, the prediction service receives an application programming interface request to obtain predictions. In at least one embodiment, the application programming interface is similar to the one described in relation to FIG. 2.

At 804, the prediction service analyzes a dataset provided via the application programming interface. In at least one embodiment, this comprises analyzing a time series, or other series, of data in the dataset to identify patterns. The prediction service may further identify boundary points between portions of a series exhibiting different patterns, and sub-divide portions exhibiting the same pattern into sub-portions for training, validation, and prediction.

At 806, the prediction service determines types for a plurality of predictive models. In at least one embodiment, this comprises selecting a neural network architecture and training method for each model. As described in relation to FIGS. 3-5, the service may select the types of the predictive models based on patterns observed in a time series, or other series, of data in the dataset. In at least one embodiment, one or more predictive models are generated for each recognized pattern within the data, and the types of models used is based at least partially on the observed pattern.

At 808, the prediction service trains the predictive models using the dataset. As noted, a type of predictive model may be selected based on a portion of the dataset that exhibits a pattern. The prediction service may then sub-divide this portion into sub-portions for training, validation, and prediction. Accordingly, the prediction service may use the training sub-portion to train the predictive model, and the validation sub-portion to validate the predictive model.

At 810, the prediction service applies ensembling to the predictive models. In at least one embodiment, the ensembling comprises generating a composite model. The composite model may reflect validation results of the various models, so that the output of stronger models is emphasized. The composite model may further include logic to react to the cases in which a particular model might outperform others, such as models which perform best for particular data patterns, particular types of events, and so forth.

At 812, the prediction service generates predictions using the predictive models.

At 814, the prediction service updates the predictive models based on an additional dataset. The additional dataset may be provided via the application programming interface, and analyzed by the prediction service. In at least one embodiment, when the dataset contains a time series or other series of data that exhibits a new pattern, not observed in the original dataset, the service may generate a new predictive model whose type is determined based on the new pattern. In some cases and embodiments, the service may determine to retrain the existing models, without changing their type, using the new data. This can include training an existing model from a reinitialized starting point, or refining the existing model with the new data.

At 816, the prediction service generates predictions using the updated predictive models.

In the preceding and following description, various techniques are described. For purposes of explanation, specific configurations and details are set forth in order to provide a thorough understanding of possible ways of implementing the techniques. However, it will also be apparent that the techniques described may be practiced in different configurations without these specific details. Furthermore, well-known features may be omitted or simplified in the description to avoid obscuring the techniques being described.

As one skilled in the art will appreciate in light of this disclosure, certain embodiments may be capable of achieving certain advantages, including enabling use of machine learning for non-expert users, enabling incorporation of improved machine learning techniques into existing applications, and improving prediction performance.

FIG. 9 illustrates aspects of an example system 900 for implementing aspects in accordance with an embodiment. As will be appreciated, although a web-based system is used for purposes of explanation, different systems may be used, as appropriate, to implement various embodiments. In an embodiment, the system includes an electronic client device 902, which includes any appropriate device operable to send and/or receive requests, messages, or information over an appropriate network 904 and convey information back to a user of the device. Examples of such client devices include personal computers, cellular or other mobile phones, handheld messaging devices, laptop computers, tablet computers, set-top boxes, personal data assistants, embedded computer systems, electronic book readers, and the like. In an embodiment, the network includes any appropriate network, including an intranet, the Internet, a cellular network, a local area network, a satellite network or any other such network and/or combination thereof, and components used for such a system depend at least in part upon the type of network and/or system selected. Many protocols and components for communicating via such a network are well known and will not be discussed herein in detail. In an embodiment, communication over the network is enabled by wired and/or wireless connections and combinations thereof. In an embodiment, the network includes the Internet and/or other publicly addressable communications network, as the system includes a web server 906 for receiving requests and serving content in response thereto, although for other networks an alternative device serving a similar purpose could be used as would be apparent to one of ordinary skill in the art.

In an embodiment, the illustrative system includes at least one application server 908 and a data store 910, and it should be understood that there can be several application servers, layers or other elements, processes or components, which may be chained or otherwise configured, which can interact to perform tasks such as obtaining data from an appropriate data store. Servers, in an embodiment, are implemented as hardware devices, virtual computer systems, programming modules being executed on a computer system, and/or other devices configured with hardware and/or software to receive and respond to communications (e.g., web service application programming interface (API) requests) over a network. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered system. Data stores, in an embodiment, communicate with block-level and/or object-level interfaces. The application server can include any appropriate hardware, software and firmware for integrating with the data store as needed to execute aspects of one or more applications for the client device, handling some or all of the data access and business logic for an application.

In an embodiment, the application server provides access control services in cooperation with the data store and generates content including but not limited to text, graphics, audio, video and/or other content that is provided to a user associated with the client device by the web server in the form of HyperText Markup Language ("HTML"), Extensible Markup Language ("XML"), JavaScript, Cascading Style Sheets ("CSS"), JavaScript Object Notation (JSON), and/or another appropriate client-side or other structured language. Content transferred to a client device, in an embodiment, is processed by the client device to provide the content in one or more forms including but not limited to forms that are perceptible to the user audibly, visually and/or through other senses. The handling of all requests and responses, as well as the delivery of content between the client device 902 and the application server 908, in an embodiment, is handled by the web server using PHP: Hypertext Preprocessor ("PHP"), Python, Ruby, Perl, Java, HTML, XML, JSON, and/or another appropriate server-side structured language in this example. In an embodiment, operations described herein as being performed by a single device are performed collectively by multiple devices that form a distributed and/or virtual system.

The data store 910, in an embodiment, includes several separate data tables, databases, data documents, dynamic data storage schemes and/or other data storage mechanisms and media for storing data relating to a particular aspect of the present disclosure. In an embodiment, the data store illustrated includes mechanisms for storing production data 912 and user information 916, which are used to serve content for the production side. The data store also is shown to include a mechanism for storing log data 914, which is used, in an embodiment, for reporting, computing resource management, analysis or other such purposes. In an embodiment, other aspects such as page image information and access rights information (e.g., access control policies or other encodings of permissions) are stored in the data store in any of the above listed mechanisms as appropriate or in additional mechanisms in the data store 910.

The data store 910, in an embodiment, is operable, through logic associated therewith, to receive instructions from the application server 908 and obtain, update or otherwise process data in response thereto, and the application server 908 provides static, dynamic, or a combination of static and dynamic data in response to the received instructions. In an embodiment, dynamic data, such as data used in web logs (blogs), shopping applications, news services, and other such applications, are generated by server-side structured languages as described herein or are provided by a content management system ("CMS") operating on or under the control of the application server. In an embodiment, a user, through a device operated by the user, submits a search request for a certain type of item. In this example, the data store accesses the user information to verify the identity of the user, accesses the catalog detail information to obtain information about items of that type, and returns the information to the user, such as in a results listing on a web page that the user views via a browser on the user device 902. Continuing with this example, information for a particular item of interest is viewed in a dedicated page or window of the browser. It should be noted, however, that embodiments of the present disclosure are not necessarily limited to the context of web pages, but are more generally applicable to processing requests in general, where the requests are not necessarily requests for content. Example requests include requests to manage and/or interact with computing resources hosted by the system 900 and/or another system, such as for launching, terminating, deleting, modifying, reading, and/or otherwise accessing such computing resources.

In an embodiment, each server typically includes an operating system that provides executable program instructions for the general administration and operation of that server and includes a computer-readable storage medium (e.g., a hard disk, random access memory, read only memory, etc.) storing instructions that, if executed by a processor of the server, cause or otherwise allow the server to perform its intended functions (e.g., the functions are performed as a result of one or more processors of the server executing instructions stored on a computer-readable storage medium).

The system 900, in an embodiment, is a distributed and/or virtual computing system utilizing several computer systems and components that are interconnected via communication links (e.g., transmission control protocol (TCP) connections and/or transport layer security (TLS) or other cryptographically protected communication sessions), using one or more computer networks or direct connections. However, it will be appreciated by those of ordinary skill in the art that such a system could operate in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices that can be used to operate any of a number of applications. In an embodiment, user or client devices include any of a number of computers, such as desktop, laptop or tablet computers running a standard operating system, as well as cellular (mobile), wireless and handheld devices running mobile software and capable of supporting a number of networking and messaging protocols, and such a system also includes a number of workstations running any of a variety of commercially available operating systems and other known applications for purposes such as development and database management. In an embodiment, these devices also include other electronic devices, such as dummy terminals, thin-clients, gaming systems and other devices capable of communicating via a network, and virtual devices such as virtual machines, hypervisors, software containers utilizing operating-system level virtualization and other virtual devices or non-virtual devices supporting virtualization capable of communicating via a network.

In an embodiment, a system utilizes at least one network that would be familiar to those skilled in the art for supporting communications using any of a variety of commercially available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and other protocols. The network, in an embodiment, is a local area network, a wide-area network, a virtual private network, the Internet, an intranet, an extranet, a public switched telephone network, an infrared network, a wireless network, a satellite network, and any combination thereof. In an embodiment, a connection-oriented protocol is used to communicate between network endpoints such that the connection-oriented protocol (sometimes called a connection-based protocol) is capable of transmitting data in an ordered stream. In an embodiment, a connection-oriented protocol can be reliable or unreliable. For example, the TCP protocol is a reliable connection-oriented protocol. Asynchronous Transfer Mode ("ATM") and Frame Relay are unreliable connection-oriented protocols. Connection-oriented protocols are in contrast to packet-oriented protocols such as UDP that transmit packets without a guaranteed ordering.

In an embodiment, the system utilizes a web server that runs one or more of a variety of server or mid-tier applications, including Hypertext Transfer Protocol ("HTTP") servers, FTP servers, Common Gateway Interface ("CGI") servers, data servers, Java servers, Apache servers, and business application servers. In an embodiment, the one or more servers are also capable of executing programs or scripts in response to requests from user devices, such as by executing one or more web applications that are implemented as one or more scripts or programs written in any programming language, such as Java®, C, C# or C++, or any scripting language, such as Ruby, PHP, Perl, Python or TCL, as well as combinations thereof. In an embodiment, the one or more servers also include database servers, including without limitation those commercially available from Oracle®, Microsoft®, Sybase®, and IBM® as well as open-source servers such as MySQL, Postgres, SQLite, MongoDB, and any other server capable of storing, retrieving, and accessing structured or unstructured data. In an embodiment, a database server includes table-based servers, document-based servers, unstructured servers, relational servers, non-relational servers, or combinations of these and/or other database servers.

In an embodiment, the system includes a variety of data stores and other memory and storage media as discussed above that can reside in a variety of locations, such as on a storage medium local to (and/or resident in) one or more of the computers or remote from any or all of the computers across the network. In an embodiment, the information resides in a storage-area network ("SAN") familiar to those skilled in the art and, similarly, any necessary files for performing the functions attributed to the computers, servers or other network devices are stored locally and/or remotely, as appropriate. In an embodiment where a system includes computerized devices, each such device can include hardware elements that are electrically coupled via a bus, the elements including, for example, at least one central processing unit ("CPU" or "processor"), at least one input device (e.g., a mouse, keyboard, controller, touch screen, or keypad), at least one output device (e.g., a display device, printer, or speaker), at least one storage device such as disk drives, optical storage devices, and solid-state storage devices such as random access memory ("RAM") or read-only memory ("ROM"), as well as removable media devices, memory cards, flash cards, etc., and various combinations thereof.

In an embodiment, such a device also includes a computer-readable storage media reader, a communications device (e.g., a modem, a network card (wireless or wired), an infrared communication device, etc.), and working memory as described above where the computer-readable storage media reader is connected with, or configured to receive, a computer-readable storage medium, representing remote, local, fixed, and/or removable storage devices as well as storage media for temporarily and/or more permanently containing, storing, transmitting, and retrieving computer-readable information. In an embodiment, the system and various devices also typically include a number of software applications, modules, services, or other elements located within at least one working memory device, including an operating system and application programs, such as a client application or web browser. In an embodiment, customized hardware is used and/or particular elements are implemented in hardware, software (including portable software, such as applets), or both. In an embodiment, connections to other computing devices such as network input/output devices are employed.

In an embodiment, storage media and computer readable media for containing code, or portions of code, include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed but, on the contrary, the intention is to cover all modifications, alternative constructions, and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. Similarly, use of the term "or" is to be construed to mean "and/or" unless contradicted explicitly or by context. The terms "comprising," "having," "including," and "containing" are to be construed as open-ended terms (i.e., meaning "including, but not limited to,") unless otherwise noted. The term "connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within the range, unless otherwise indicated herein, and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal. The use of the phrase "based on," unless otherwise explicitly stated or clear from context, means "based at least in part on" and is not limited to "based solely on."

Conjunctive language, such as phrases of the form "at least one of A, B, and C," or "at least one of A, B and C," (i.e., the same phrase with or without the Oxford comma) unless specifically stated otherwise or otherwise clearly contradicted by context, is otherwise understood within the context as used in general to present that an item, term, etc., may be either A or B or C, any nonempty subset of the set of A and B and C, or any set not contradicted by context or otherwise excluded that contains at least one A, at least one B, or at least one C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}, and, if not contradicted explicitly or by context, any set having {A}, {B}, and/or {C} as a subset (e.g., sets with multiple "A"). Thus, such conjunctive language is not generally intended to imply that certain embodiments require at least one of A, at least one of B and at least one of C each to be present. Similarly, phrases such as "at least one of A, B, or C" and "at least one of A, B or C" refer to the same as "at least one of A, B, and C" and "at least one of A, B and C" refer to any of the following sets: {A}, {B}, {C}, {A, B}, {A, C}, {B, C}, {A, B, C}, unless differing meaning is explicitly stated or clear from context. In addition, unless otherwise noted or contradicted by context, the term "plurality" indicates a state of being plural (e.g., "a plurality of items" indicates multiple items). The number of items in a plurality is at least two but can be more when so indicated either explicitly or by context.

Operations of processes described herein can be performed in any suitable order unless otherwise indicated herein or otherwise clearly contradicted by context. In an embodiment, a process such as those processes described herein (or variations and/or combinations thereof) is performed under the control of one or more computer systems configured with executable instructions and is implemented as code (e.g., executable instructions, one or more computer programs or one or more applications) executing collectively on one or more processors, by hardware or combinations thereof. In an embodiment, the code is stored on a computer-readable storage medium, for example, in the form of a computer program comprising a plurality of instructions executable by one or more processors. In an embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In an embodiment, code (e.g., executable code or source code) is stored on a set of one or more non-transitory computer-readable storage media having stored thereon executable instructions that, when executed (i.e., as a result of being executed) by one or more processors of a computer system, cause the computer system to perform operations described herein. The set of non-transitory computer-readable storage media, in an embodiment, comprises multiple non-transitory computer-readable storage media, and one or more of individual non-transitory storage media of the multiple non-transitory computer-readable storage media lack all of the code while the multiple non-transitory computer-readable storage media collectively store all of the code. In an embodiment, the executable instructions are executed such that different instructions are executed by different processors—for example, in an embodiment, a non-transitory computer-readable storage medium stores instructions and a main CPU executes some of the instructions while a graphics processor unit executes other instructions. In another embodiment, different components of a computer system have separate processors and different processors execute different subsets of the instructions.

Accordingly, in an embodiment, computer systems are configured to implement one or more services that singly or collectively perform operations of processes described herein, and such computer systems are configured with applicable hardware and/or software that enable the performance of the operations. Further, a computer system, in an embodiment of the present disclosure, is a single device and, in another embodiment, is a distributed computer system comprising multiple devices that operate differently such that the distributed computer system performs the operations described herein and such that a single device does not perform all operations.

The use of any and all examples or exemplary language (e.g., "such as") provided herein is intended merely to better illuminate embodiments of the invention and does not pose a limitation on the scope of the invention unless otherwise claimed. No language in the specification should be construed as indicating any non-claimed element as essential to the practice of the invention.

Embodiments of this disclosure are described herein, including the best mode known to the inventors for carrying out the invention. Variations of those embodiments may become apparent to those of ordinary skill in the art upon reading the foregoing description. The inventors expect skilled artisans to employ such variations as appropriate, and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references including publications, patent applications, and patents cited herein are hereby incorporated by reference to the same extent as if each reference were individually and specifically indicated to be incorporated by reference and were set forth in its entirety herein.

What is claimed is:

1. A system, comprising:

at least one processor; and at least one memory comprising computer-executable instructions that, in response to execution by the at least one processor, cause the system to:

receive an invocation of an application programming interface that indicates a request to obtain predictions, including a frequency for making the predictions;

in response to the request, determine a plurality of types for a plurality of predictive models, the plurality of types determined based, at least in part, on analysis of one or more patterns in a dataset obtained via the application programming interface;

train the plurality of predictive models, using training data obtained from the dataset, wherein a predictive model is trained and validated based, at least in part, on one or more portions of the dataset determined to comprise a first pattern of the one or more patterns in the dataset obtained via the application programming interface;

generate a first prediction using the plurality of predictive models based, at least in part, on the frequency for making the predictions;

determine that a second portion of an additional dataset exhibits a second pattern associated with a type of model not included in the plurality of predictive models;

generate a modified version of the plurality of predictive models;

deploy the modified version of the plurality of predictive models to one or more computing devices;

generate a second prediction using the modified version of the plurality of predictive models by adding an additional predictive model of the type determined based, at least in part, on the second pattern exhibited in the additional dataset, wherein the additional predictive model is trained and validated based, at least in part, on one or more portions of the additional dataset that exhibit the second pattern; and generate a second prediction via the application programming interface using the modified version of the plurality of predictive models.

2. The system of claim 1, the at least one memory comprising further computer-executable instructions that, in response to execution by the at least one processor, cause the system to:

determine that the one or more portions of the dataset exhibits a first pattern and that a second portion of the dataset exhibits a second pattern; and select the plurality of types based, at least in part, on the first and second patterns.

3. The system of claim 1, wherein the additional predictive model has a type determined based, at least in part, on analysis of the second pattern exhibited in the additional dataset.

4. The system of claim 1, wherein the additional predictive model is of a type determined to be more suitable for use with data of the second pattern than other types of the plurality of predictive models.

5. The system of claim 1, the at least one memory comprising further computer-executable instructions that, in response to execution by the at least one processor, cause the system to:

determine parameters and hyperparameters of the plurality of predictive models based, at least in part, on analysis of the dataset.

6. A computer-implemented method, comprising:

receiving, via an application programming interface, a request to obtain predictions;

analyzing, in response to the request, a dataset received by the application programming interface to determine a plurality of types for a plurality of predictive models based at least in part on analysis of one or more patterns in a dataset obtained via the application programming interface;

training the plurality of predictive models based, at least in part, on at least a portion of the dataset, wherein a predictive model is trained and validated based, at least in part, on one or more portions of the dataset determined to comprise a first pattern;

generating a first prediction using the plurality of predictive models based, at least in part, on a frequency indicated by the request for making the predictions;

determining that a second portion of an additional dataset exhibits a second pattern associated with a type of model not included in the plurality of predictive models;

generating a modified version of the plurality of predictive models by adding an additional predictive model having a type determined based, at least in part, on the second pattern exhibited in the additional dataset, wherein the additional predictive model is trained and validated based, at least in part, on one or more portions of the additional dataset that exhibit the second pattern;

deploying the modified version of the plurality of predictive models to one or more computing devices; and generating a second prediction via the application programming interface using the modified version of the plurality of predictive models.

7. The computer-implemented method of claim 6, wherein the one or more types are determined based on patterns exhibited by the one or more portions of the dataset.

8. The computer-implemented method of claim 6, wherein parameters and hyperparameters for training the plurality of predictive models is determined based, at least in part, on analysis of the dataset.

9. The computer-implemented method of claim 6, further comprising retraining at least one of the plurality of predictive models using data from the additional dataset.

10. The computer-implemented method of claim 6, further comprising:

identifying a portion of the dataset that exhibits a pattern;

training a predictive model of the plurality of predictive models based, at least in part, on a first sub-portion of the portion; and generating the first prediction based, at least in part, on a second sub-portion of the portion.

11. The computer-implemented method of claim 6, wherein the dataset comprises at least one time series.

12. The computer-implemented method of claim 6, wherein the dataset comprises at least one time series and at least one additional set of data indicative of events associated with the time series.

13. The computer-implemented method of claim 6, further comprising:

generating a plurality of predictions using the plurality of predictive models;

selecting one of the plurality of predictions; and providing the selected one of the plurality of predictions to a client of the application programming interface.

14. A non-transitory computer-readable storage medium storing thereon executable instructions that, as a result of being executed by one or more processors of a computer system, cause the computer system to at least:

receive, by an application programming interface, a request to obtain predictions, including a frequency for making predictions, wherein the predictions are to be made using a plurality of predictive models generated based, at least in part, on a dataset provided by the application programming interface;

select a plurality of types for the plurality of predictive models based, at least in part, on analysis of the dataset;

determine that the dataset comprises one or more patterns;

train and validate the plurality of predictive models based, at least in part, on one or more portions of the dataset that includes at least one of the one or more patterns;

generate a first prediction using the plurality of predictive models based, at least in part, on the frequency for making predictions;

determine that a second portion of an additional dataset includes a second pattern corresponding to a type of model not included in the plurality of predictive models;

generate a modified version of the plurality of predictive models by adding an additional predictive model of the type determined based, at least in part, on the second pattern included in the additional dataset, wherein the additional predictive model is trained and validated based, at least in part, on one or more portions of the additional dataset that include the second pattern;

deploy the modified version of the plurality of predictive models to one or more computing devices; and generate a second prediction via the application programming interface using the modified plurality of predictive models.

15. The non-transitory computer-readable storage medium of claim 14, wherein the instructions further comprise instructions that, as a result of being executed by the one or more processors, cause the computer system to:

generate a first predictive model of the plurality of predictive models, the first predictive model of a first type selected based, at least in part, on the one or more portions of the dataset that exhibits a first pattern; and generate a second predictive model of the plurality of predictive models, the second predictive model of a second type selected based, at least in part, on a second portion of the dataset that exhibits a second pattern.

16. The non-transitory computer-readable storage medium of claim 14, wherein at least one of the plurality of predictive models is retrained using data from an additional dataset.

17. The non-transitory computer-readable storage medium of claim 14, wherein the instructions further comprise instructions that, as a result of being executed by the one or more processors, cause the computer system to:

identify a portion of the dataset that exhibits a pattern;

train a predictive model of the plurality of predictive models based, at least in part, on a first sub-portion of the portion; and generate the first prediction based, at least in part, on a second sub-portion of the portion.

18. The non-transitory computer-readable storage medium of claim 14, wherein the instructions further comprise instructions that, as a result of being executed by the one or more processors, cause the computer system to:

determine parameters and hyperparameters of the plurality of predictive models based, at least in part, on analysis of the dataset.

19. The non-transitory computer-readable storage medium of claim 14, wherein the request comprises information indicative of a frequency of predictions.

20. The non-transitory computer-readable storage medium of claim 14, wherein the instructions further comprise instructions that, as a result of being executed by the one or more processors, cause the computer system to:

generate a plurality of predictions using the plurality of predictive models;

select one or more of the plurality of predictions; and return the selected one or more of the plurality of predictions to a client of the application programming interface.

* * * * *